United States Patent
Gilra

(10) Patent No.: US 11,069,066 B2
(45) Date of Patent: Jul. 20, 2021

(54) DYNAMICALLY CHANGE TRACKER SPEED, SWITCH CROP RECTANGLES, AND DISPLAY INVISIBLE CORNERS VIA ZOOM-LOUPES

(71) Applicant: Adobe Inc., San Jose, CA (US)

(72) Inventor: Anant Gilra, San Jose, CA (US)

(73) Assignee: Adobe Inc., San Jose, CA (US)

( * ) Notice: Subject to any disclaimer, the term of this patent is extended or adjusted under 35 U.S.C. 154(b) by 112 days.

(21) Appl. No.: 16/547,489

(22) Filed: Aug. 21, 2019

(65) Prior Publication Data

US 2021/0056702 A1 Feb. 25, 2021

(51) Int. Cl.
  *G06T 7/11* (2017.01)
  *G06F 3/0484* (2013.01)
  *G06T 7/12* (2017.01)

(52) U.S. Cl.
  CPC ............ *G06T 7/11* (2017.01); *G06F 3/04845* (2013.01); *G06T 7/12* (2017.01); *G06T 2207/20101* (2013.01); *G06T 2207/20104* (2013.01); *G06T 2207/20132* (2013.01)

(58) Field of Classification Search
  CPC combination set(s) only.
  See application file for complete search history.

(56) References Cited

U.S. PATENT DOCUMENTS

| | | | |
|---|---|---|---|
| 7,750,825 B2 | 7/2010 | Zuverink | |
| 7,831,901 B1 | 11/2010 | Balev | |
| 7,916,157 B1 | 3/2011 | Kelley et al. | |
| 8,683,377 B2 | 3/2014 | Zuverink et al. | |
| 8,819,556 B1 | 8/2014 | Balev | |
| 8,924,851 B2 | 12/2014 | Wichmann | |
| 10,901,589 B1* | 1/2021 | Gilra | G06F 3/04845 |
| 2005/0285880 A1* | 12/2005 | Lai | G06F 3/0481 345/660 |
| 2006/0177132 A1* | 8/2006 | Jackson | H04N 1/3873 382/173 |
| 2010/0287493 A1* | 11/2010 | Majumder | G06F 3/0481 715/788 |
| 2014/0362090 A1* | 12/2014 | Langoulant | G06T 3/04812 345/467 |

OTHER PUBLICATIONS

Notice of Allowance from related U.S. Appl. No. 16/546,964 dated Sep. 3, 2020, 20 pages.

* cited by examiner

*Primary Examiner* — Tsung Yin Tsai
(74) *Attorney, Agent, or Firm* — Kilpatrick Townsend & Stockton LLP

(57) ABSTRACT

Techniques described herein address the issue of inadequate view of areas of a crop rectangle for a user while cropping an image. The inadequate view may be due to the user zooming, panning, or rotating the image such that some or all of the crop rectangle may no longer be within view in the graphical user interface. The solution of zoom-loupes provide a view of the corners and user selected points on the edge of the crop rectangle that may be magnified to assist the user to set the crop rectangle area precisely. Additionally, a second crop rectangle can be generated when the entire first/original crop rectangle is unavailable because it is outside the view in the graphical user interface. Using the second crop rectangle, the user may use the second crop rectangle to complete pixel perfect cropping.

20 Claims, 13 Drawing Sheets

DYNAMICALLY CHANGE TRACKER SPEED, SWITCH CROP RECTANGLES, AND DISPLAY INVISIBLE CORNERS VIA ZOOM-LOUPES

CROSS-REFERENCE TO RELATED APPLICATION

This application is related to co-pending U.S. Utility application Ser. No. 16/546,964, filed Aug. 21, 2019, entitled "AUTOMATIC ZOOM-LOUPE CREATION, SELECTION, LAYOUT, AND RENDERING BASED ON INTERACTION WITH CROP RECTANGLE" (hereinafter the "Corresponding Application") the content of which is herein incorporated by reference in its entirety.

BACKGROUND

Cropping an image in an image-editing tool using a graphical user interface is common for users. It matters not whether the user is a professional photographer or an amateur first time image editor, when cropping an image the user generally would like to ensure that the cropped area is correctly represented. In some cases, the crop may need to be very precise.

BRIEF SUMMARY

In a typical cropping function, the user selects the corner or edge of the crop rectangle which can be moved to select the area for cropping out and/or keeping in the image. However, in some cases, to see closely what the user would like to keep or remove, the user may have to zoom into an area of the image, leaving other areas of the crop image outside the viewing area of the graphical user interface. As a result, many users have to undo the cropping function and/or perform an iterative process of cropping multiple times to achieve the desired result. As such, pixel perfect cropping is difficult, if not impossible.

Techniques described herein address the issue of inadequate view of areas of the crop rectangle during a cropping function due to zooming, panning, or rotating the image in the graphical user interface such that portions of the crop rectangle may no longer be displayed in the graphical user interface. Zoom-loupes provide a view of corners and other user-selected areas of the edge of the crop rectangle. Each zoom-loupe provides a view of the area around the corner or the user-selected point, each of which may be magnified, to assist the user to set the crop rectangle area precisely.

Techniques described herein include providing zoom-loupe functionality during a cropping function for a user to view selected areas of the image being cropped at a magnified factor to aid in the cropping selection process. In certain embodiments, the image editing system receives an indication of a change in view (e.g., a magnification factor change, a field of view change, or the like) of the image in the graphical user interface. The image editing system determines that a corner of the crop rectangle is outside the viewing area of the graphical user interface. In response, the image editing system generates and displays a zoom-loupe for the corner, where the zoom-loupe dynamically displays a portion of the image corresponding to the corner of the crop rectangle at a magnification factor including a depiction of the demarcation line within the zoom-loupe.

In some embodiments generating the zoom-loupe includes identifying the area of the image to include in the zoom-loupe, determining dimensions of the zoom-loupe, and determining a location on the graphical user interface to display the zoom-loupe. In some embodiments, the change in view causes additional corners of the crop rectangle to be outside the viewing area of the graphical user interface. The image editing system, in response, generates additional zoom-loupes for other corners not within the viewing area of the graphical user interface. In some embodiments, the user may indicate selection of a zoom point on the crop rectangle. The change in view may cause the zoom point to be outside the viewing area of the graphical user interface. The image editing system, in response, generates a zoom-point zoom-loupe for the zoom point.

In some embodiments, the change in view causes the crop rectangle to be outside the viewing area of the graphical user interface. In such embodiments, additional zoom-loupes for each corner of the crop rectangle can be generated and displayed. In response to determining the crop rectangle is outside the viewing area of the graphical user interface, the image editing system can generate a second crop rectangle representing the first crop rectangle, where the second crop rectangle connects the zoom-loupes in each corner of the graphical user interface for a user to adjust the first crop rectangle using the second crop rectangle. In some embodiments, zoom-point zoom-loupes may also be displayed, and the demarcation line in the zoom-loupe aligns with the second crop rectangle. In some embodiments, the tracker speed of the first crop rectangle that determines a speed of movement of the crop rectangle based on the speed of movement of the resizing tool (e.g., the user's finger) is different from the tracker speed of the second crop rectangle. In some embodiments, the tracker speed of the second crop rectangle is based on the magnification factor of the image in the graphical user interface. Implementations of the described techniques may include hardware, a method or process, or computer software on a computer-accessible medium.

The foregoing, together with other features and embodiments will become more apparent upon referring to the following specification, claims, and accompanying drawings.

DETAILED DESCRIPTION

Figure 1:
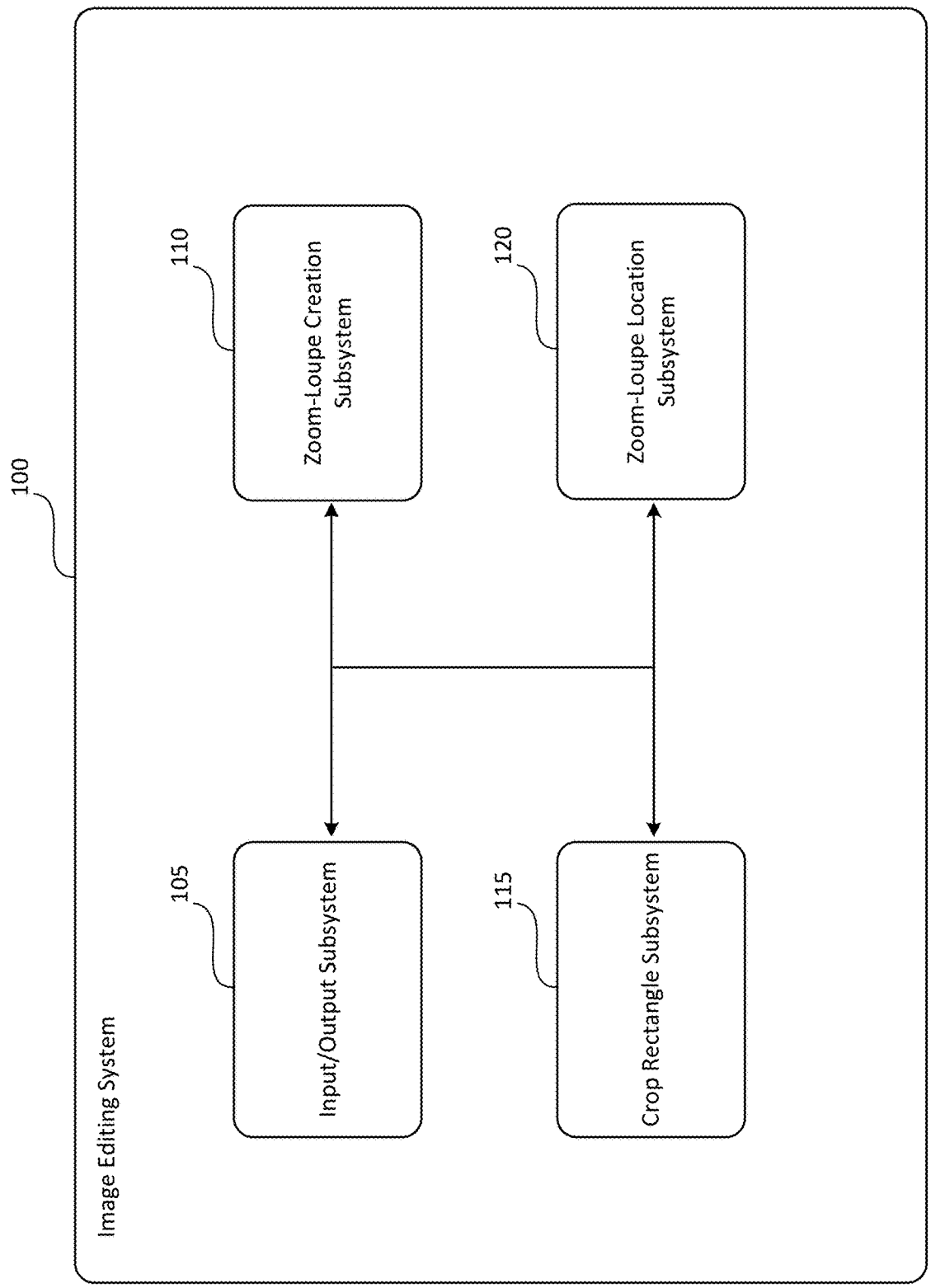
FIG. 1 illustrates a simplified block diagram of an image editing system, according to some embodiments.

In the following description, for the purposes of explanation, specific details are set forth to provide a thorough understanding of certain inventive embodiments. However, it will be apparent that various embodiments may be practiced without these specific details. The figures and description are not intended to be restrictive.

This disclosure relates generally to generating zoom-loupes, which are magnification points along the edge or at the corner of a crop rectangle for aiding the user in precisely sizing and placing the crop rectangle when performing image editing. The problem being addressed is that, in current implementations of image editing systems, when a user zooms into an image or adjusts the view of the image in the graphical user interface, some portions of the crop rectangle may become outside the view of the graphical user interface. Additionally, getting a close enough view to various points along the edge of the crop rectangle can prove difficult and frustrating, resulting in the user having to perform cropping iteratively and often not getting the pixel perfect cropping desired. Even a crop that is off by five pixels may be too much for some professionals. Further, with high resolution and panoramic images, one millimeter of the screen may occupy approximately fifty pixels.

A solution for this problem is to provide a zoom-loupe for the corners of the crop rectangle when the user zooms into the image such that some or all of the crop rectangle is not within the view of the graphical user interface. In addition, the user can configure zoom points on the crop rectangle to get a close view at points along the edge of the crop rectangle when zoomed in. Once the user zooms in or otherwise changes the view of the crop rectangle (e.g., zoom, pan, or rotate the image) such that the image is not completely within the view of the graphical user interface, some or all of the zoom-loupes can be generated and displayed depending on the configuration of the system and whether some or all of the crop rectangle is within view of the graphical user interface. Additionally, if the crop rectangle goes completely outside the view of the graphical user interface, a second crop rectangle can be generated to represent the first crop rectangle that is outside the view of the graphical user interface. The second crop rectangle can connect the four corner zoom-loupes as well as any zoom-point zoom-loupes configured. Additionally, the second crop rectangle can have a second tracker that has a speed adjusted based on the magnification factor of the image. For example, if the image is zoomed in to a pixelated point, the tracker moves very slow to allow for pixel perfect cropping.

This solution can be configured within any image editing system on any computer system. However, the solution is particularly useful for systems such as tablets or other wireless or mobile devices in which the user's finger or stylus is used for image editing and/or the available screen space is limited. For example, this solution may be configured within a mobile image editing application.

Referring to the drawings, FIG. 1 illustrates an image editing system 100. The image editing system 100 may include an input/output subsystem 105, a zoom-loupe creation subsystem 110, a zoom point subsystem 115, and a zoom-loupe location subsystem 120. Image editing system 100 may be implemented in a computer system such as computer system 1300 of FIG. 13. The image editing system may be an image editing application installed on computer system 1300 or served in a cloud based system such as that depicted in FIG. 12. While specific subsystems are described herein, the functionality described may be performed in more or fewer subsystems. In addition, other functionality performed by the image editing system 100 may be performed by other subsystems that have been excluded for the purposes of brevity and clarity.

Input/Output subsystem 105 may provide interface functionality to the screen or other input/output devices used to manipulate the image features within the image editing system 100. Examples of input/output devices include a screen for viewing the graphical user interface, a touchscreen for interacting with the graphical user interface with a finger or a stylus, a mouse, a keyboard, and/or the like. The input/output subsystem 105 may receive indications of interactions with the graphical user interface for processing by the image editing system 100. For example, an indication that the user has provided a zoom point location, selected an edge or corner of a crop rectangle for resizing, or has changed the magnification factor of the image (e.g., zoomed in or out) may be transmitted to the image editing system 100 through the input/output subsystem 105.

Zoom-loupe creation subsystem 110 may provide functionality for creating corner zoom-loupes and zoom-point zoom-loupes. The user may change the magnification factor of the image, pan the image, and/or rotate the image, and the zoom-loupe creation subsystem 110 receives an indication to determine if all or a portion of the crop rectangle is outside the view of the graphical user interface. If so, the zoom-loupe creation subsystem 110 creates a zoom-loupe for corners and zoom points that are outside the viewing area. In some embodiments, if even a portion of the crop rectangle is outside the viewing area, a corner zoom-loupe is created for each corner of the crop rectangle and for each zoom point the user has configured. In some embodiments, the crop rectangle may be centered on the graphical user interface, such that if one corner is outside the viewing area, all corners may be outside the viewing area. The zoom-loupe creation subsystem 110 receives information regarding the magnification factor from the input/output subsystem 105. The zoom-loupe creation subsystem 110 also receives indication of the zoom points for creation of zoom-point zoom-loupes.

Before generation of the zoom-loupe, the image editing system 100 may generate a snapshot of the image being edited at an optimal resolution. The image displayed in the zoom-loupe can be selected from the snapshot to improve performance so that the zoom-loupes need not be re-rendered over and over. The resolution of the snapshot is selected based on the magnification factor of the image in the graphical user interface. If a magnification factor of the image in the graphical user interface is high (e.g., 200%), the resolution of the snapshot is higher than if the image in the graphical user interface is low (e.g., 50%). The snapshot can be reused for the zoom-loupes during mouse drags and panning the image. In some embodiments, the snapshot may be reused for the zoom-loupes during some magnification changes if they do not exceed a threshold change value.

Once the magnification change of the image in the graphical user interface exceeds the threshold value, a new snapshot is generated. For example, if the magnification factor change is greater than ten percent (10%), a new snapshot may be generated. Further, if the image is rotated, a new snapshot may be generated. Optimizations may be obtained by rotating the same snapshot to use in the zoom-loupes. Rotating may result in several changes with respect to the snapshot including, for example, the center location of the image within the zoom-loupe, the size of the snapshot, and/or the point mapping with respect to the old snapshot.

The zoom-loupe creation subsystem 110 may next determine the type and shape of zoom-loupe to generate. There are two types of zoom-loupes. An edge zoom-loupe is created for user-selected zoom points. Corner zoom-loupes are generated for each corner of the crop rectangle.

A corner zoom-loupe is used to provide a zoom-loupe of each corner region of the crop rectangle. There are four different corners, so there are four different options for corner zoom-loupes. The corner zoom-loupes are approximately square, and in some embodiments may have rounded corners. In some embodiments, each corner zoom-loupe may have a different shape due to the rounded corners, for example. In embodiments shown for example in FIG. 3, the exterior corner is rounded and the other corners are not. The corner zoom-loupe, such as corner zoom-loupe 305 of FIG. 3, displays a portion of the snapshot that corresponds to the area of the image surrounding the associated corner of the crop rectangle. A portion of the image displayed in the zoom-loupe is within the crop area and a portion is outside the crop area. In other words, the crop rectangle divides the zoom-loupe using a demarcation line within the zoom-loupe. The portion within the demarcation line will remain after the crop function is complete (i.e., the non-crop area), and the portion outside the demarcation line will be removed by the crop function (i.e., the crop area). Approximately twenty-five percent (25%) of the zoom-loupe is outside the crop rectangle as depicted in the FIGS. However, any percentage of the zoom-loupe may be outside the crop rectangle, and in some embodiments, this may be a configurable option for the user to set. In some embodiments, the area outside the crop rectangle (on the cropped side of the demarcation line) is shaded to depict its removal by the crop function. In some embodiments, the area inside the crop rectangle (on the other side of the demarcation line) is highlighted in the zoom-loupe. In some embodiments, the demarcation line is not visible, but is instead only indicated by the shading and/or highlighting. In some embodiments, the shading or highlighting type and/or whether there is shading or highlighting may be configurable by the user.

Edge zoom-loupes are generated based on zoom points configured by the user. The selection of zoom points may be done with, for example, a tap of the edge or corner of the crop rectangle. In some embodiments, a specific zoom point selection may be made within a menu for the crop rectangle to enable zoom point selection. Once a zoom point is set, the zoom-point zoom-loupes are created when appropriate based on, as described above, the user changing the view of the image such that the crop rectangle or some portion of it is no longer within the viewing area of the graphical user interface. In some embodiments, the same magnification factor is used for all zoom-loupes.

Figure 8:
FIG. 8 illustrates an example image being edited with corner zoom-loupes and zoom-point zoom-loupes, according to some embodiments.

The edge zoom-loupe, such as edge zoom-loupes 820, 825, 835, and 850 of FIG. 8, displays a portion of the image surrounding a point on the edge of the crop rectangle that is closest to the selected point by the user. The selection point the user identifies for a zoom point may not be precisely upon the crop rectangle. The zoom-loupe creation subsystem 110 can determine the coordinates to use for the selection point based on the coordinates of the actual selection point and the coordinates of the crop rectangle. If the actual selection point is within a threshold distance from one of the corners of the crop rectangle, the selection point used will be the corner of the crop rectangle, and no zoom point may be created since a corner zoom-loupe is generated for each corner of the crop rectangle. If the actual selection point is not within a threshold distance from the corner, the selection point used will be the closest point on the edge of the crop rectangle measured perpendicularly from the actual selection point to the crop rectangle.

As with a corner zoom-loupe, a portion of the image displayed in the edge zoom-loupe is within the crop area and a portion is outside the crop area. In other words, the crop rectangle divides the zoom-loupe using a demarcation line within the zoom-loupe. The portion within the demarcation line will remain after the crop function is complete, and the portion outside the demarcation line will be removed by the crop function. Approximately twenty-five percent (25%) of the zoom-loupe is outside the crop rectangle as depicted in the FIGS. However, any percentage of the zoom-loupe may be outside the crop rectangle, and in some embodiments, this may be a configurable option for the user to set. In some embodiments, the area outside the crop rectangle (on the cropped side of the demarcation line) is shaded to depict its removal by the crop function. In some embodiments, the area inside the crop rectangle (on the other side of the demarcation line) is highlighted in the zoom-loupe. In some embodiments, the demarcation line is not visible, but is instead only indicated by the shading and/or highlighting. In some embodiments, the shading and/or highlighting type and/or whether there is shading and/or highlighting may be configurable by the user. There are horizontal edge zoom-loupes and vertical edge zoom-loupes. The horizontal edge zoom-loupes are used on the top and bottom edges of the crop rectangle as viewed on the graphical user interface, and the vertical edge zoom-loupes are used on the left and right edges of the crop rectangle as viewed on the graphical user interface. Zoom-loupe placement on the graphical user interface is discussed in more detail with respect to zoom-loupe location subsystem 120.

The magnification factor for each displayed zoom-loupe is selected such that the user can see enough of the image in the zoom-loupe to make an informed decision on the cropping function. For example, when the magnification factor of the displayed image is large (e.g., 200%), the magnification factor of the zoom-loupe will be, smaller (e.g., 50%). Generally, the magnification factor used in the zoom-loupe is inversely proportional to the magnification factor of the displayed image in the graphical user interface. Because the display in the zoom-loupe is selected from the snapshot, the magnification factor may be set with respect to the snapshot. The snapshot is generated based on the magnification factor of the image in the graphical user interface, so the magnification factor of the zoom-loupe is in turn based on the magnification factor of the displayed image via the snapshot.

The portion of the image displayed in the zoom-loupe is selected from the snapshot based on the selection point used on the crop rectangle. The coordinates of the selection point are associated with a specific point on the image being edited based on the displayed image, and that position corresponds to a location on the snapshot. For a vertical edge zoom-loupe, the specific point on the image is centered vertically within the zoom-loupe and placed approximately twenty-five percent of the way in from the outside edge of the zoom-loupe. For a horizontal edge zoom-loupe, the specific point on the image is centered vertically within the zoom-loupe and placed approximately twenty-five percent of the way in from the outside edge of the zoom-loupe. For a corner zoom-loupe, the specific point on the image is placed approximately twenty-five percent of the way in from each outside edge of the zoom-loupe. The area surrounding the specific point to fill the zoom-loupe at the desired magnification factor is then used to display in the zoom-loupe. In this way, approximately twenty-five percent of the image within the zoom-loupe is area that will be cropped by the crop function. While twenty-five percent is used, any percentage can be used if desired, and in some embodiments the user may be able to select the portion of the zoom-loupe dedicated to the area outsize the crop rectangle.

Additionally, the zoom-loupes dynamically change as the user resizes or otherwise modifies the crop rectangle. Accordingly, this process of determining which portion of the image is displayed changes as the user resizes or moves the crop rectangle. As the crop rectangle location and size changes, the area of the image displayed in the zoom-loupe also changes. To account for resizing of the crop rectangle outside the image area of the graphical user interface, a gravity point is used to display the remaining portion of the image appropriately within the zoom-loupe. For example, the gravity point for the zoom-loupe in the upper right corner of the crop rectangle is the bottom left corner of the zoom-loupe. In this way, as the crop rectangle is moved up and to the right beyond the image boundaries, the portion of the image remaining to display within the crop rectangle appears in the lower left portion of the zoom-loupe. Other edges and corners are similarly configured. Accordingly, the gravity point of a zoom-loupe in the lower left corner of the crop rectangle is the upper right corner of the zoom-loupe. A top edge zoom-loupe gravity point is at the bottom of the zoom-loupe. Further, the gravity point may change for a zoom-loupe if, for example, a top edge zoom-loupe is moved to the far left of the crop rectangle, the gravity point will move to the bottom right of the zoom-loupe, but if that same zoom-loupe is moved to the far right of the crop rectangle, the gravity point will move to the bottom left of the zoom-loupe. Additionally, if a crop rectangle is flipped by a user, for example, dragging the top edge of the crop rectangle below the bottom edge, the gravity point will flip as well.

If the crop rectangle is resized to the point that there is no longer a portion of the image within the zoom-loupe, in some embodiments the zoom-loupe is no longer displayed. When the user returns the magnification factor of the image such that the crop rectangle is viewable, the zoom-loupes may no longer be displayed/may be removed.

If the user determines he would like to remove one or more zoom points, they may be removed by, for example, pressing the "alt" key while tapping the zoom point. In addition, the user may move a zoom point by selecting near the zoom point and sliding along the edge to move the zoom point. The user may completely reset/remove all zoom points by double tapping the screen, for example, or by selecting a reset menu function. Such a reset may also, for example, reset the crop rectangle to surround the entire image and restart the crop function. Each of these functions will generate an indication received by the input/output subsystem 105. The input/output subsystem 105 provides the indication to the zoom point subsystem 115 for processing.

The process for creating a zoom-loupe is repeated for each corner and each selected zoom point. In some embodiments, the number of zoom points is limited to, for example, two per edge of the crop rectangle (e.g., two per top edge, two per bottom edge, two per right edge, and two per left edge). Limiting the number of zoom points may help stop the graphical user interface from becoming too crowded with zoom-loupes. In some embodiments in which the zoom points are limited, selection of a zoom point past the limited number may result in a notification on the graphical user interface that no additional zoom points may be selected on that edge. In some embodiments in which the zoom points are limited, selection of a zoom point past the limited number may result in removal of the next closest zoom point. In some embodiments, if two zoom points are selected very close to each other (e.g., within a distance such that both zoom-loupes would show an overlapping portion of the image), the zoom points are combined into a single zoom point. The single zoom point may be positioned centered between the two selected zoom points, for example or the first zoom point may be removed in favor of the second one.

Zoom-loupe location subsystem 120 may provide functionality for determining a location for each zoom-loupe on the displayed graphical user interface. The location determination for each zoom-loupe, both zoom-point zoom-loupes and corner zoom-loupes, is dependent upon the available screen real estate for the graphical user interface as well as unused space within the graphical user interface for the cropping function. Zoom-loupe location subsystem 120 determines the location of the corner zoom-loupes first. Corner zoom-loupes are located in the corner of the graphical user interface associated with the corner of the crop rectangle each represents. In some embodiments when the user has zoomed into the image, the corner zoom-loupes are placed over the image since they remain in the corner of the graphical user interface. To ensure visibility, in some embodiments, the corner zoom-loupes are surrounded by a small dark background and that is surrounded by a small light background or vice versa.

Once the corner zoom-loupes are located on the graphical user interface, the zoom-point zoom-loupes are positioned. The zoom-point zoom-loupes are centered vertically with the zoom point for vertical zoom-loupes and centered horizontally with the zoom point for horizontal zoom-loupes. The edge zoom-point zoom-loupes are also placed along the edge of the graphical user interface. Zoom-point zoom-loupes remain fixed in one axis despite the user changing the magnification factor or viewing area of the image. For example, a zoom-point zoom-loupe on the top edge of the crop rectangle, such as zoom-point zoom-loupe 835 of FIG. 8, remains fixed to the top edge of the user interface. However, as the user zooms in our out of the image, the location of the zoom-point zoom-loupe may move right or left along the top edge to align as closely with the location of the zoom-point as possible. If the magnification factor changes sufficiently to cause the zoom-point zoom-loupe to collide with a corner zoom-loupe, the zoom-point zoom-loupe will then remain next to the corner zoom-loupe, for example, with a small gap separating the two zoom-loupes. In some embodiments, two edge zoom-point zoom-loupes may be adjusted to avoid colliding with each other, leaving each as aligned with the zoom point as possible with a small gap between them.

Crop rectangle subsystem 115 generates a second crop rectangle when the image editing system 100 determines that the crop rectangle is out of the viewing area of the graphical user interface. The second crop rectangle connects the corner zoom-loupes and any zoom-point zoom-loupes with a crop rectangle that aligns with the demarcation line in each zoom-loupe. This second crop rectangle represents the original/first crop rectangle the user can no longer see or utilize. Once the first crop rectangle is outside the viewing area of the graphical user interface, the handles for resizing or moving the crop rectangle cannot be accessed. The second crop rectangle provides the ability for the user to modify the crop rectangle even while using the zoomed in or modified viewing area. Each crop rectangle has a tracker speed, which determines how fast or far the crop rectangle moves in response to movement of the user input tool. For example, if the user uses a stylus to adjust the crop rectangle, the tracker speed determines what distance the user needs to move the stylus to obtain a corresponding change in the crop rectangle. The second crop rectangle may have a second tracker speed that is based on the magnification factor of the image being viewed. For example, the tracker speed may be inversely proportional to the magnification factor. For example, if the user is zoomed in to the pixel level, the tracker speed is very slow to allow for very precise, pixel perfect cropping.

In use, the second crop rectangle provides the user the ability to modify the cropped area. When the user selects the second crop rectangle to modify the cropped area, the crop rectangle may not visibly move in the graphical user interface. Rather, the view within the zoom-loupes that is affected by the movement will change to show the user where the new, modified crop rectangle edge or corner is with respect to the image being cropped. Because the zoom-loupes may be fixed to the edges of the graphical user interface, the zoom-loupes may not move on the graphical user interface. Only the view within the zoom-loupes may change, in some embodiments.

When the user returns the magnification factor of the image to view any portion of the first/original crop rectangle, the second crop rectangle is removed. The zoom-loupes are also removed when they are no longer needed due to the user's view of the crop rectangle being restored. In some embodiments, the crop rectangle may be centered on the graphical user interface so that the user will have either zero, two, or four edges of the original crop rectangle visible at any given time.

The following figures provide detailed example images and exemplary methods for generating the zoom-loupes.

Figure 2:
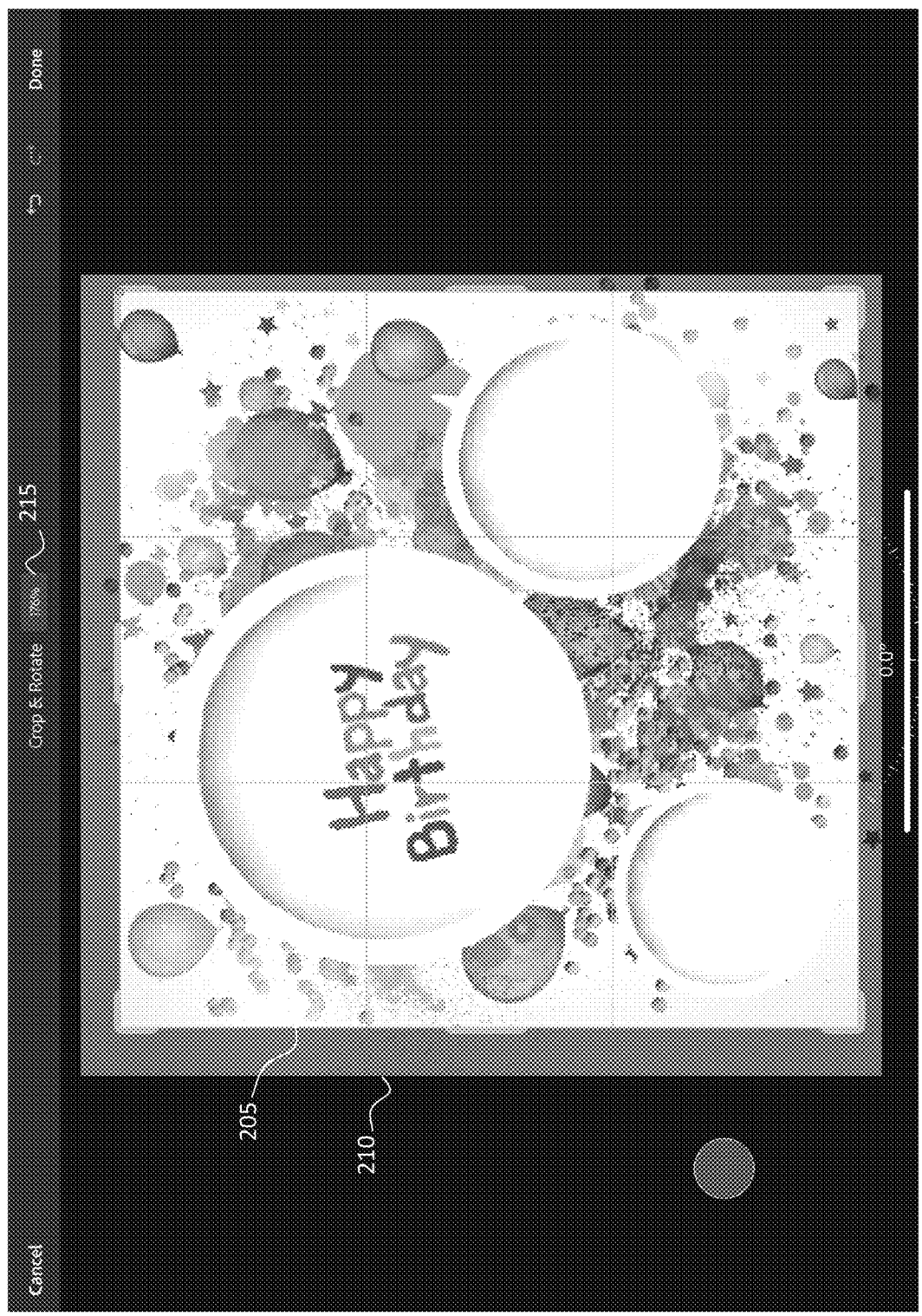
FIG. 2 illustrates an example image being edited with a crop rectangle, according to some embodiments.

FIG. 2 illustrates an example graphical user interface 200 of an image-editing system performing a crop function. The image 210 is within the image-editing system for editing and may be stored in memory of the image-editing system. The crop function is engaged, and a crop rectangle 205 is displayed in the graphical user interface. The user may modify a view of the image in the graphical user interface. For example, the user may pan, rotate, or zoom the image. As shown in magnification indicator 215, the magnification factor of the image is at one hundred and seventy-six percent. At this magnification factor, the entire crop rectangle is in the viewing area of the graphical user interface 200 and no zoom-loupes are generated.

Figure 3:
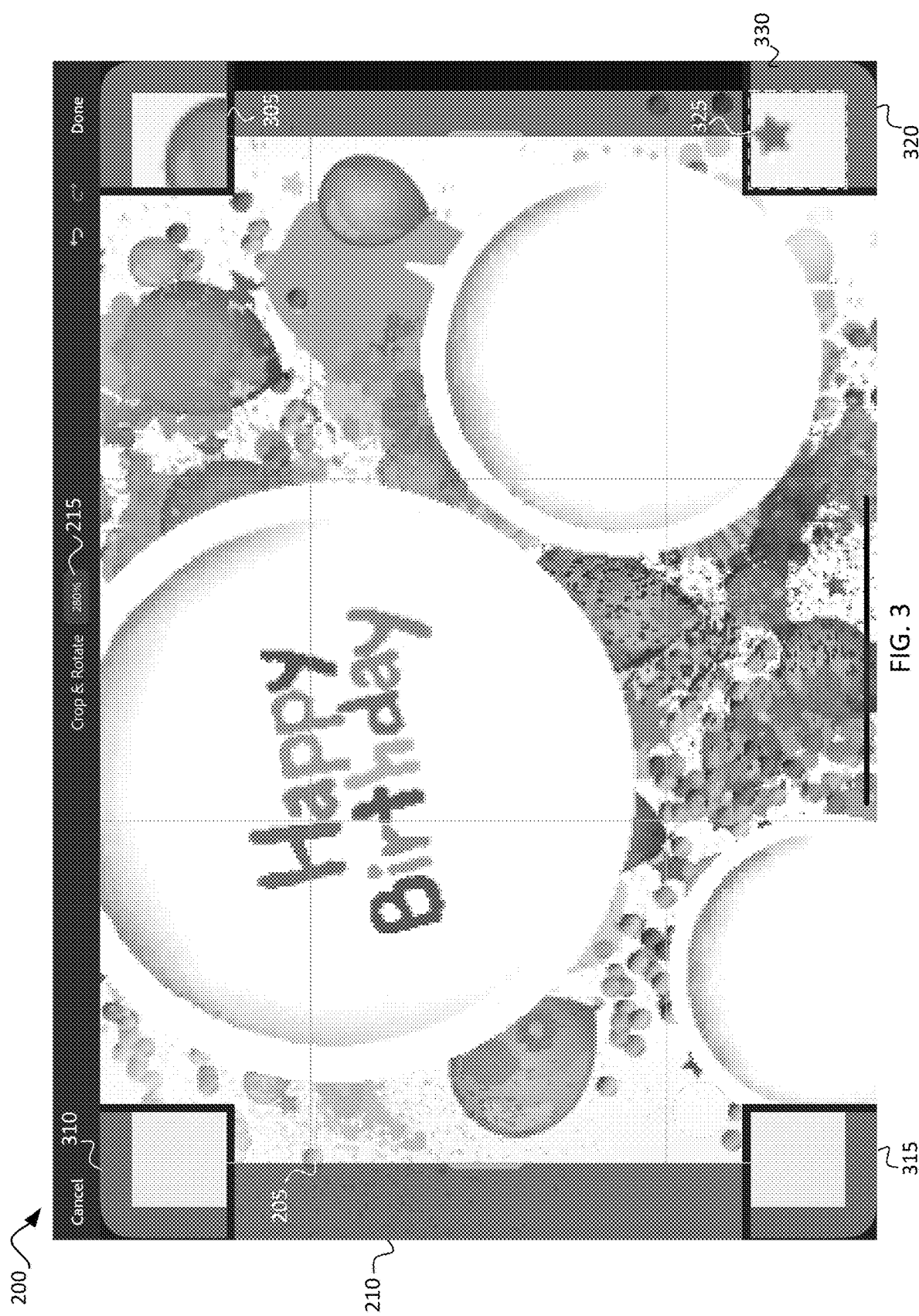
FIG. 3 illustrates an example image being edited with corner zoom-loupes, according to some embodiments.

FIG. 3 illustrates graphical user interface 200 while zoomed into a magnification factor of two hundred and eighty percent according to magnification indicator 215. The crop rectangle 205 is not fully within the viewing area of the graphical user interface 200. The top edge and bottom edge and all four corners of the crop rectangle are not within the viewing area. When the user zooms in to this level, for example, corner zoom-loupes 305, 310, 315, and 320 are generated. The corner zoom-loupes 305, 310, 315, and 320 may be generated by, for example, zoom-loupe creation subsystem 110. The dimensions of the corner zoom-loupes 305, 310, 315, and 320 are selected to provide a helpful view of the portion of the image in each corner of the crop rectangle. In FIG. 3, there is not unused graphical user interface screen real estate (i.e., the area of the graphical user interface outside the displayed image space), so the zoom-loupes are located on the displayed image. To distinguish the zoom-loupes, a surrounding dark border is placed behind the zoom-loupe to separate the zoom-loupe from the displayed image 210. Corner zoom-loupes 305, 310, 315, and 320 have square dimensions. The zoom-loupes may have one or more rounded corners as shown in some embodiments. In FIG. 3, the side dimensions are approximately one eighth of the length of the vertical edge of the image. The magnification factor of the portion of the image displayed in the zoom-loupes 305, 310, 315, and 320 are substantially greater than the magnification factor of the image 210, providing a magnified view. The corner zoom-loupes 305, 310, 315, and 320 each have two portions. As shown in corner zoom-loupe 320, the first portion 325 is the area of the image that is displayed in the corner zoom-loupe 320 that is within the crop rectangle 205 and will not be removed by the crop function. The second portion 330 is the portion outside the crop rectangle 205 that will be removed by the crop function. The first portion 325 and the second portion 330 are divided by a demarcation line that is displayed in the corner zoom-loupe 320 for the user to identify the cropped area. The corner zoom-loupe 320, for example, is positioned in the lower right corner of the graphical user interface since it is displaying the lower right corner of the crop rectangle 205. Each corner zoom-loupe 305, 310, 315, and 320 are located in the associated corner of the graphical user interface. The corner zoom-loupes 305, 310, 315, and 320 may be positioned by, for example, zoom-loupe location subsystem 120. At the current magnification factor, there is not sufficient available screen real estate within the graphical user interface but outside the displayed image area to display the corner zoom-loupes 305, 310, 315, and 320 without placing the corner zoom-loupes 305, 310, 315, and 320 on the image 210.

In the image depicted in FIG. 3, a portion of two edges (the right and left edges) of the crop rectangle 205 are still displayed within view of the user in the graphical user interface 200. In this state, the four corner zoom-loupes 305, 310, 315, and 320 are displayed since each of them are out of view in the graphical user interface 200. In some embodiments, a selection-point zoom-loupe may be generated and displayed within this view if the user were to select a portion of the viewable crop rectangle 205 for adjusting the crop rectangle. Selection-point zoom-loupes are discussed in detail in the Corresponding Application.

Figure 4:
FIG. 4 illustrates an example image being edited with corner zoom-loupes and a second crop rectangle, according to some embodiments.

FIG. 4 illustrates graphical user interface 200 while zoomed into a magnification factor of four hundred and ninety percent according to magnification indicator 215. The crop rectangle 205 is not within the viewing area of the graphical user interface 200. When the user zooms in to this level, for example, corner zoom-loupes 305, 310, 315, and 320 are displayed as well as second crop rectangle 405. The second crop rectangle 405 may be created by, for example, crop rectangle subsystem 115. As shown in FIG. 4, the corner zoom-loupes 305, 310, 315, and 320 are located on top of the image 210 because the image 210 at this magnification factor uses the entire graphical user interface screen availability. To ensure visibility, as shown, the corner zoom-loupes 305, 310, 315, and 320 are surrounded by a dark background frame to provide a distinction between the corner zoom-loupes 305, 310, 315, and 320 and the image 210. As shown in FIG. 4, the second crop rectangle 405 connects the four corner zoom-loupes 305, 310, 315, and 320 such that the second crop rectangle 405 aligns with the demarcation line in each corner zoom-loupe 305, 310, 315, and 320. Further, the second crop rectangle 405 may be used to adjust the crop rectangle 205. Movement of the crop rectangle 405 will adjust the location of the crop rectangle 205 as shown in each of the corner zoom-loupes 305, 310, 315, and 320. Such adjustment modifies the area of the image 210 that is depicted in each corner zoom-loupe 305, 310, 315, and 320. Additionally, as the user zooms in to a greater magnification factor of the image 210, the speed tracker of the second crop rectangle 405 becomes slower, allowing for pixel perfect cropping.

Figure 5:
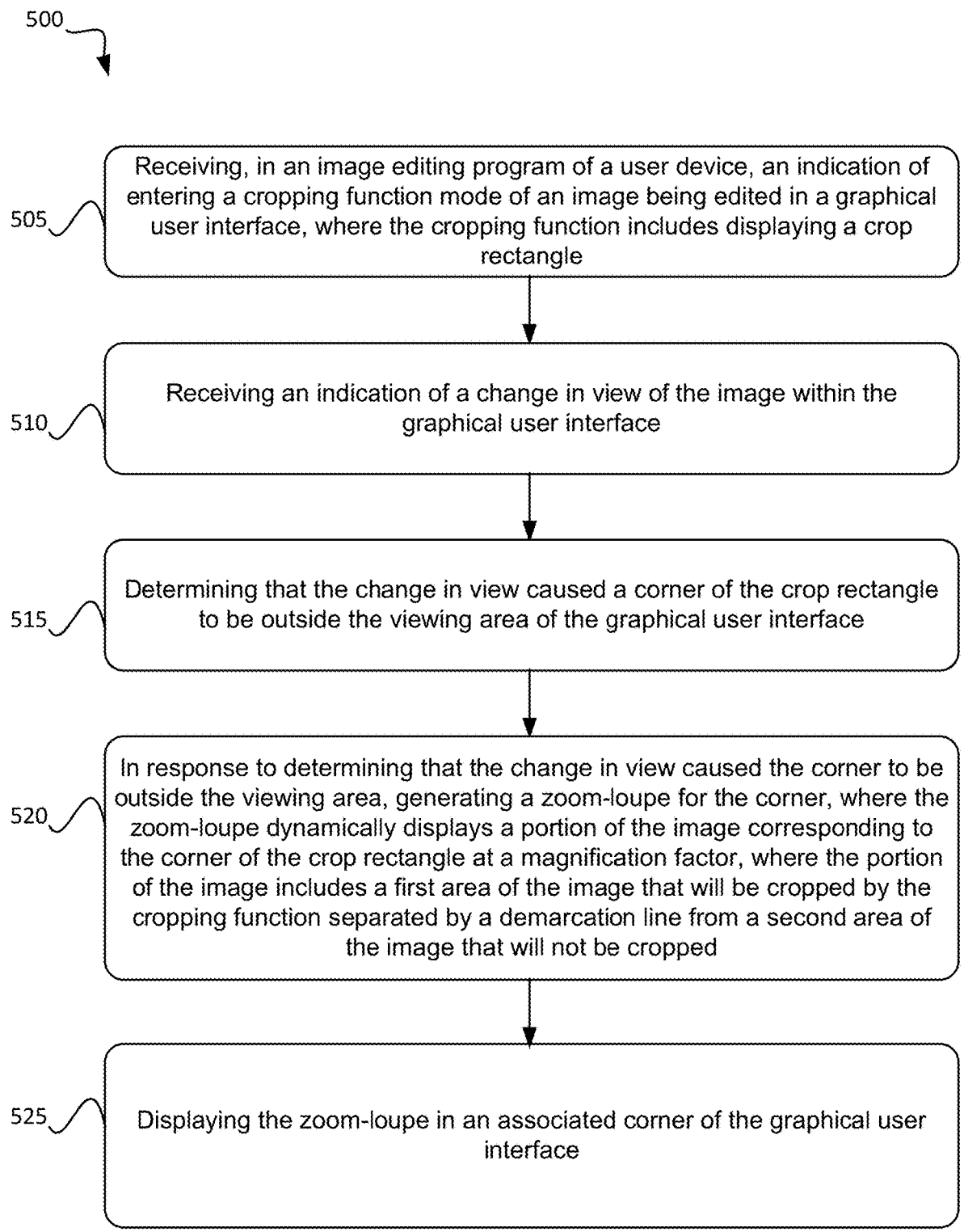
FIG. 5 illustrates an example method for using corner zoom-loupes while editing a crop rectangle, according to some embodiments.

FIG. 5 illustrates a method 500 for generating a corner zoom-loupe in response to a portion of the crop rectangle going out of view of the graphical user interface. The method 500 may be performed by image editing system 100 and more specifically by zoom-loupe creation subsystem 110 and zoom-loupe location subsystem 120. The method begins at step 505 with the image editing system receiving an indication of entering a cropping function mode of an image being edited in a graphical user interface. The cropping function includes displaying a crop rectangle. When the user enters cropping mode, an indication of the selection can be provided through input/output subsystem 105 to the zoom-loupe creation subsystem 110.

At step 510, the image editing system receives an indication of a change of view of the image within the graphical user interface. The change in view can be, for example, a change in the magnification factor of the image (i.e., zooming in or out of the image). The change in view may also be a movement of the viewing area in the graphical user interface, for example panning left, right, up, or down. The change in view may also be a rotation of the image.

At step 515, the image editing system, in response to receiving the indication, determines that the change in view caused a corner of the crop rectangle to be outside the viewing area of the graphical user interface. For example, if the user increased the magnification factor of the image, an edge of the crop rectangle may be outside the viewing area of the graphical user interface.

At step 520, in response to determining the change in view caused the corner to be outside the viewing area, the image editing system generates a zoom-loupe for the corner. The zoom-loupe dynamically displays a portion of the image corresponding to the corner of the crop rectangle at a magnification factor. The portion of the image includes a first area of the image that will be cropped by the copping function separated by a demarcation line from a second area of the image that will not be cropped. For example, corner zoom-loupe 320 may be generated. In some embodiments, a zoom-loupe for each of the corners is generated if any portion of the crop rectangle is outside the view of the graphical user interface. In some embodiments, a snapshot of the image is generated and used for generating the zoom-loupe. When multiple zoom-loupes are generated (e.g., multiple corner and zoom-point zoom-loupes), the snapshot can be used to limit processing power needed to generate the zoom-loupes since the snapshot can be used for the zoom-loupes without regenerating the zoom-loupes despite movement of the crop rectangle that changes the portion of the image displayed in the zoom-loupe. In addition, the same snapshot may be used even if the magnification factor of the image displayed in the graphical user interface changes by less than, for example, ten percent (10%). If the magnification factor changes of the image in the graphical user interface by a substantial amount (e.g., greater than ten percent) a new snapshot is generated for regenerating the zoom-loupes.

At step 525, the image editing system displays the zoom-loupe in the associated corner of the graphical user interface. The zoom-loupe displays the area of the image corresponding to the corner of the crop rectangle at a magnification factor determined by the image editing system. The zoom-loupe is displayed dynamically. As the crop rectangle is resized, the zoom-loupe displays a different area of the image as it moves to correspond with the portion of the image associated with the corner of the crop rectangle. The zoom-loupe will depict a first portion of the image that will be cropped and a second portion of the image that will not be cropped separated by a demarcation line indicating the separation. In some embodiments, the portion that will be cropped will be shaded to indicate removal by the crop function. FIGS. 3 and 4 show examples of the zoom-loupes created by method 400.

Figure 6:
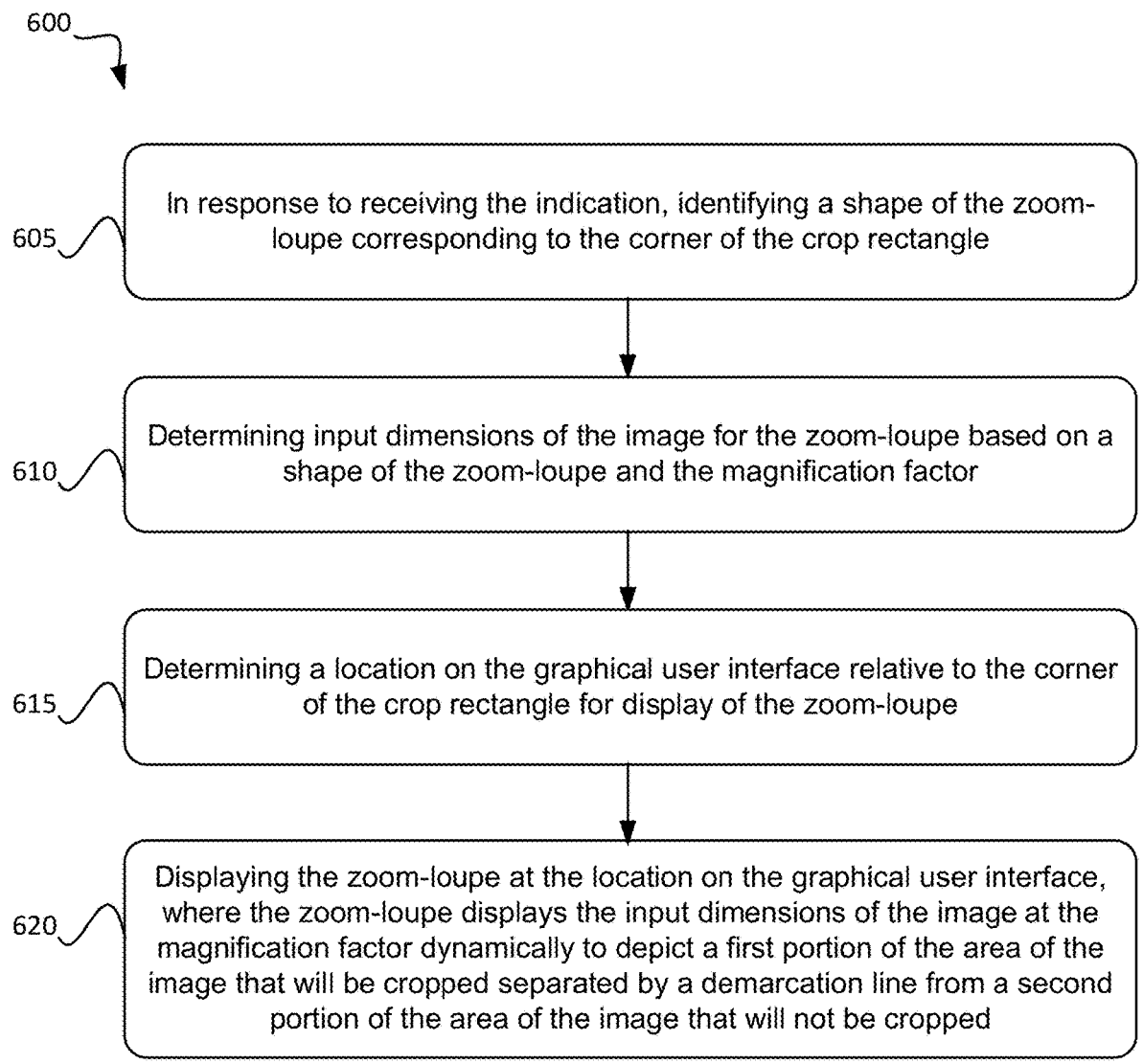
FIG. 6 illustrates another example method for using corner zoom-loupes while editing a crop rectangle, according to some embodiments.

FIG. 6 illustrates a method 600 for generating a corner zoom-loupe in response to a portion of the crop rectangle going out of view of the graphical user interface. Method 600 may be performed as a portion of step 520 of FIG. 5. The method 600 may be performed by image editing system 100 and more specifically by zoom-loupe creation subsystem 110 and zoom-loupe location subsystem 120. The method begins at step 605 with the image editing system, in response to receiving the indication, identifies an area of the image based on the corner of the crop rectangle. The coordinates of the corner of the crop rectangle are used to identify the corresponding location on the image. In some embodiments, the area of the image is identified with the point on the image that corresponds to the corner of the crop rectangle centered in the area so that the corner of the crop rectangle is centered in the zoom-loupe. In some embodiments, the corner of the crop rectangle is located in a different location within the zoom-loupe such as, for example, such that twenty-five percent of the zoom-loupe includes the portion of the image outside the crop rectangle.

At step 610, the image editing system determines dimensions of the zoom-loupe for displaying in the area of the image at a magnification factor. As described with respect to FIG. 1, the selection point subsystem may determine the dimensions of the zoom-loupe depending on the available screen real estate in the graphical user interface.

At step 615, the image editing system determines a location on the graphical user interface relative to the location of the interaction for display of the zoom-loupe. As discussed with respect to FIG. 1, the location for each zoom-loupe is along the edge of the graphical user interface. Additionally, the position along the edge of the graphical user interface is determined based on the corresponding location of the image being shown. For example, a zoom-loupe representing the upper left corner of the crop rectangle is positioned in the upper left corner of the graphical user interface.

At step 620, the image editing system displays the zoom-loupe at the location on the graphical user interface determined at step 615. The zoom-loupe displays the area of the image identified at step 610 at the magnification factor determined step 610 with dimensions as determined at step 610. The zoom-loupe is displayed dynamically. As the crop rectangle is resized, the zoom-loupe displays a different area of the image. The zoom-loupe will depict a first portion of the image that will be cropped and a second portion of the image that will not be cropped separated by a demarcation line. In some embodiments, the portion that will be cropped will be shaded to indicate removal by the crop function. FIGS. 3 and 4 show examples of the zoom-loupes created by method 600.

Figure 7:
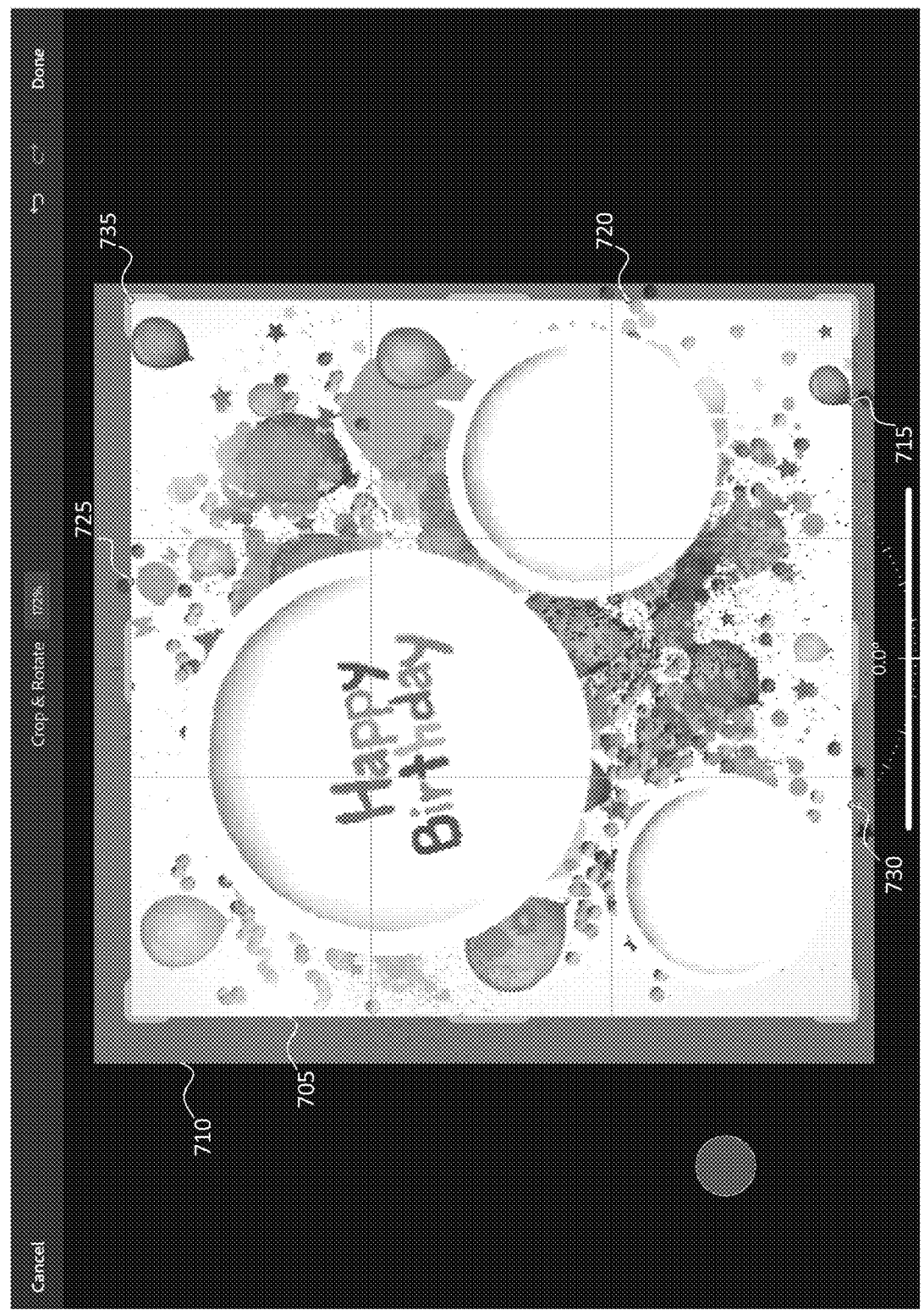
FIG. 7 illustrates an example image being edited with a crop rectangle and zoom points, according to some embodiments.

FIG. 7 illustrates an example graphical user interface 700 of an image editing system performing a crop function. The image 710 is within the image editing system for editing and may be stored in memory of the image editing system. The crop function is engaged, and a crop rectangle 705 is displayed in the graphical user interface. The user may modify the view of the image 710 by, for example, panning, zooming, or rotating the image 710. At the magnification factor shown, the entire crop rectangle 705 is in the viewing area of the graphical user interface 700 and no zoom-loupes are generated. As shown in FIG. 7, the user has configured zoom points 715, 720, 725, and 730. Zoom point 735 is also configured, which corresponds to the upper right corner of the crop rectangle 705. Since corner zoom-loupes are generated for each corner, zoom point 735 may be dismissed.

FIG. 8 illustrates graphical user interface 700 while zoomed into a magnification factor of three hundred and two percent according to magnification indicator 805. The crop rectangle 705 is not fully within the viewing area of the graphical user interface 700. The right edge, left edge, top edge, and all four corners of the crop rectangle 705 are not within the viewing area. When the user zooms in to this level, for example, corner zoom-loupes 810, 815, 820, and 825 are generated. The corner zoom-loupes 810, 815, 820, and 825 may be generated by, for example, zoom-loupe creation subsystem 110. The dimensions of the corner zoom-loupes 810, 815, 820, and 825 are selected to provide a helpful view of the portion of the image in each corner of the crop rectangle 705. In FIG. 8, there is no unused graphical user interface screen real estate (i.e., the area of the graphical user interface outside the displayed image space), and the corner zoom-loupes 810, 815, 820, and 825 have square dimensions. The zoom-point zoom-loupes 830, 835, 840, and 845 each have rectangular dimensions. Zoom-point zoom-loupe 830 corresponds to zoom point 720 of FIG. 7, zoom-point zoom-loupe 835 corresponds to zoom point 725 of FIG. 7, zoom-point zoom-loupe 840 corresponds to zoom point 730 of FIG. 7, and zoom-point zoom-loupe 845 corresponds to zoom point 715 of FIG. 7. Zoom-point zoom-loupe 830 is a vertical zoom-loupe, and zoom-point zoom-loupes 835, 840, and 845 are horizontal zoom-loupes. The zoom-loupes 810, 815, 820, 825, 830, 835, 840, and 845 may have rounded corners as shown in some embodiments. In FIG. 8, the side dimensions of the corner zoom-loupes 810, 815, 820, and 825 are approximately one eighth of the length of the vertical edge of the image. The magnification factor of the portion of the image displayed in the zoom-loupes 810, 815, 820, and 825 are substantially greater than the magnification factor of the image 710, providing a magnified view. The zoom-loupes 810, 815, 820, 825, 830, 835, 840, and 845 each have two portions. The first portion is the area of the image that is displayed in the zoom-loupe that is within the crop rectangle 705 and will not be removed by the crop function. The second portion is the portion outside the crop rectangle 705 that will be removed by the crop function. The first portion and the second portion are divided by a demarcation line that is displayed in the zoom-loupe for the user to identify the cropped area.

The corner zoom-loupes 810, 815, 820, and 825 are each positioned in the associated corner of the graphical user interface. Zoom-point zoom-loupes are positioned in the approximate location of its associated zoom point at the edge of the graphical user interface such that if the image 710 were taking up the entire graphical user interface, the associated zoom point would be centered on its associated zoom-loupe.

Figure 9:
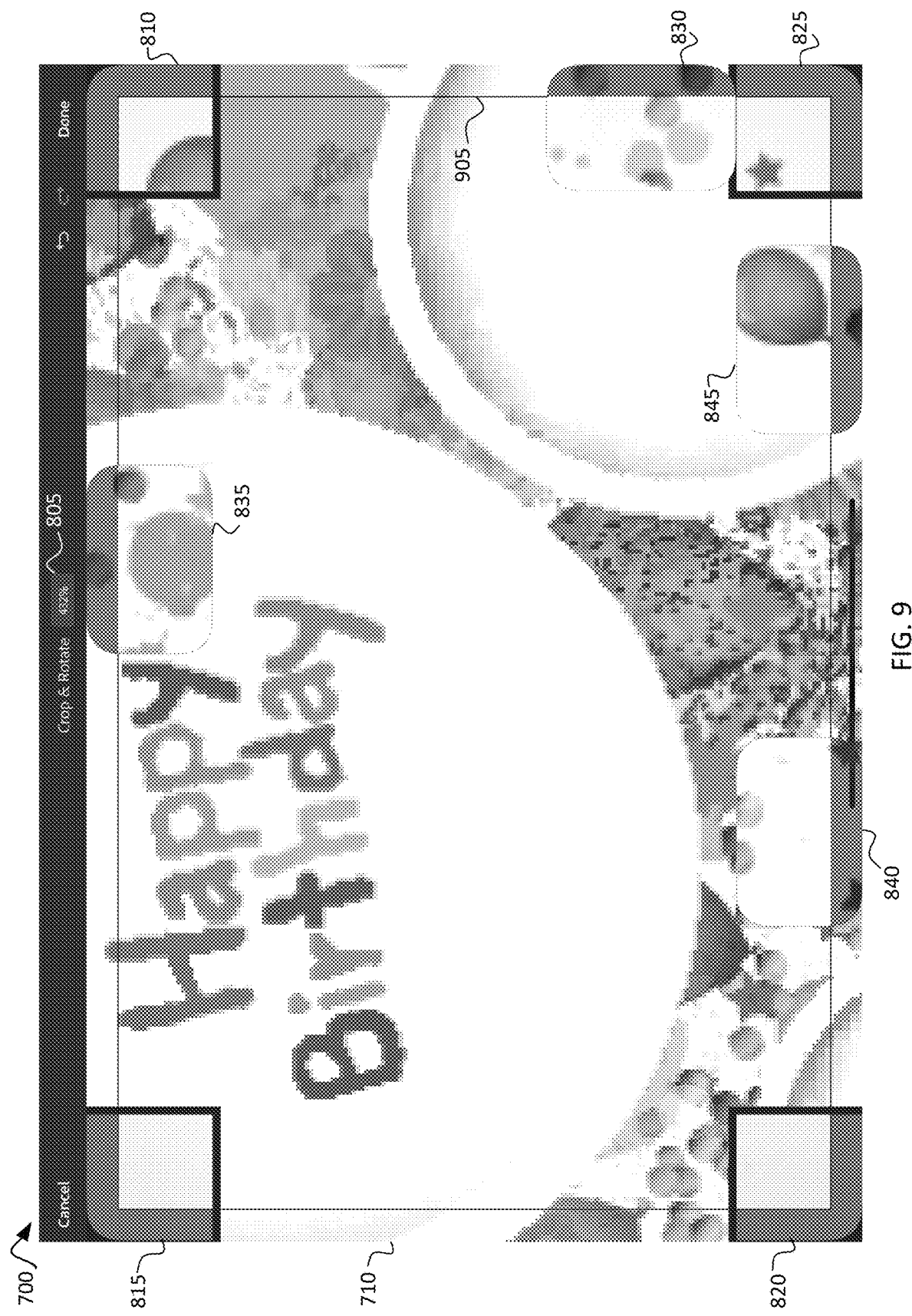
FIG. 9 illustrates an example image being edited with corner zoom-loupes, zoom-point zoom-loupes, and a second crop rectangle, according to some embodiments.

FIG. 9 illustrates graphical user interface 700 while zoomed into a magnification factor of four hundred thirty-two percent according to magnification indicator 805. The crop rectangle 705 is not within the viewing area of the graphical user interface 700. When the user zooms in to this level, the second crop rectangle 905 is generated for the user and connects the demarcation lines of corner zoom-loupes 810, 815, 820, and 825 as well as the demarcation lines of zoom-point zoom-loupes 830, 835, 840, and 845. The second crop rectangle 905 may be created by, for example, crop rectangle subsystem 115. As shown in FIG. 9, the corner zoom-loupes 810, 815, 820, and 825 and zoom-point zoom-loupes 830, 835, 840, and 845 are located on top of the image 710 because the image 710 at this magnification factor uses the entire graphical user interface screen availability. To ensure visibility, as shown, the corner zoom-loupes 810, 815, 820, and 825 are surrounded by a dark background frame to provide a distinction between the corner zoom-loupes 810, 815, 820, and 825 and the image 710. In some embodiments, zoom-point zoom-loupes 830, 835, 840, and 845 also have a border. As shown in FIG. 9, the second crop rectangle 905 connects the four corner zoom-loupes 810, 815, 820, and 825 and the zoom-point zoom-loupes 830, 835, 840, and 845 such that the second crop rectangle 905 aligns with the demarcation line in each zoom-loupe 810, 815, 820, 825, 830, 835, 840, and 845. Further, the second crop rectangle 905 may be used to adjust the crop rectangle 705. Movement of the crop rectangle 905 will adjust the location of the crop rectangle 705 as shown in each of the zoom-loupes 810, 815, 820, 825, 830, 835, 840, and 845. Such adjustment adjusts the area of the image 710 that is depicted in each zoom-loupe 810, 815, 820, 825, 830, 835, 840, and 845. Additionally, as the user zooms in to a greater magnification factor of the image 710, the speed tracker of the second crop rectangle 905 becomes slower, allowing for pixel perfect cropping.

Figure 10:
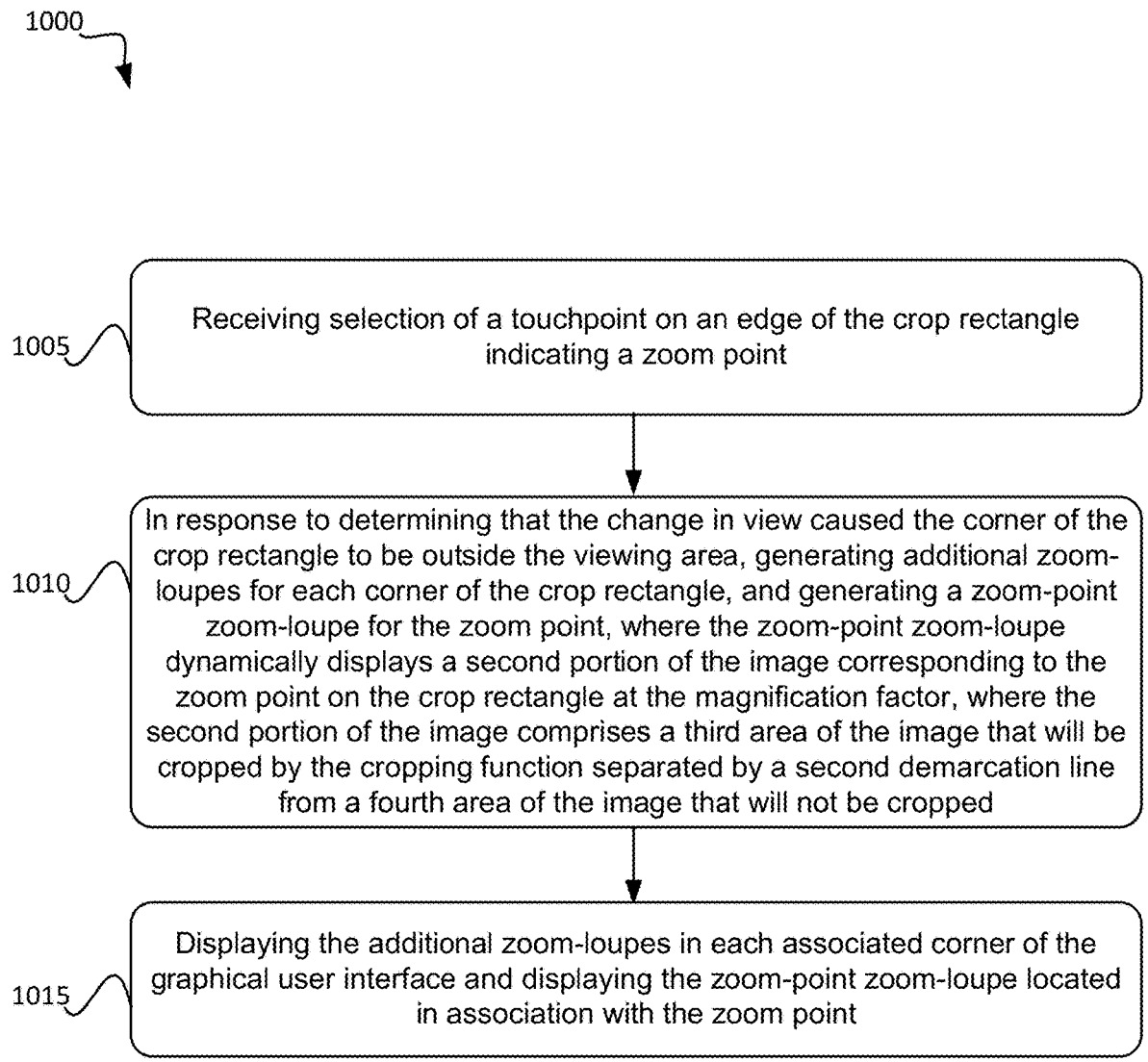
FIG. 10 illustrates an example method for using zoom-point zoom-loupes while editing a crop rectangle, according to some embodiments.

FIG. 10 illustrates a method 1000 for generating a zoom-point zoom-loupe. The method 1000 may be performed by image editing system 100 and more specifically by zoom-loupe creation subsystem 110. Method 1000 can be performed after or as part of method 500. The method 1000 begins at step 1005 with the image editing system receiving selection of a touchpoint on an edge of the crop rectangle indicating a zoom point. The user may select the zoom point by putting the image editing system into a zoom point selection mode, for example, by selecting the mode from a selection menu. In some embodiments, a quick tap of the crop rectangle can be interpreted by the image editing system to indicate a zoom point. The actual selection point of the user may not be precisely upon the crop rectangle. When the actual selection point is within a threshold distance from the corner of the crop rectangle, that corner (i.e., the coordinates where the two edges of the crop rectangle meet) are selected as the selection point. When the actual selection point is not within the threshold distance, the closest point on the edge of the crop rectangle to the actual selection point is used as the zoom point.

At step 1010, in response to determining that the change in view caused the corner of the crop rectangle to be outside the viewing area, the image editing system generates additional zoom-loupes for each corner of the crop rectangle. The image editing system also generates a zoom-loupe for each zoom point on the crop rectangle. Each zoom-loupe is created by identifying an area of the image corresponding to the associated zoom point or corner. The coordinates of the image corresponding to the zoom point or corner are selected as the center or located within the zoom-loupe as described above with respect to FIG. 1, and the area surrounding the coordinates is used to display in the zoom-loupe. Each zoom-loupe depicts a portion of the image at the zoom point or corner that is within the crop rectangle and will not be cropped by the cropping function separated by a demarcation line from a portion of the image at the zoom point or corner that is outside the crop rectangle and will be removed by the cropping function.

At step 1015, the image editing system displays the corner and zoom-point zoom-loupes at the associated location on the graphical user interface. The zoom-loupes may have the same magnification factor or differing magnification factors in some embodiments. The magnification factor for the zoom-loupes may be a selectable option for the user to configure. As with other described zoom-loupes, as the crop rectangle is moved or resized, the portion of the image within the zoom-loupe may change based on a new location of the image associated with the zoom-loupe based on the coordinates of the crop rectangle.

Figure 11:
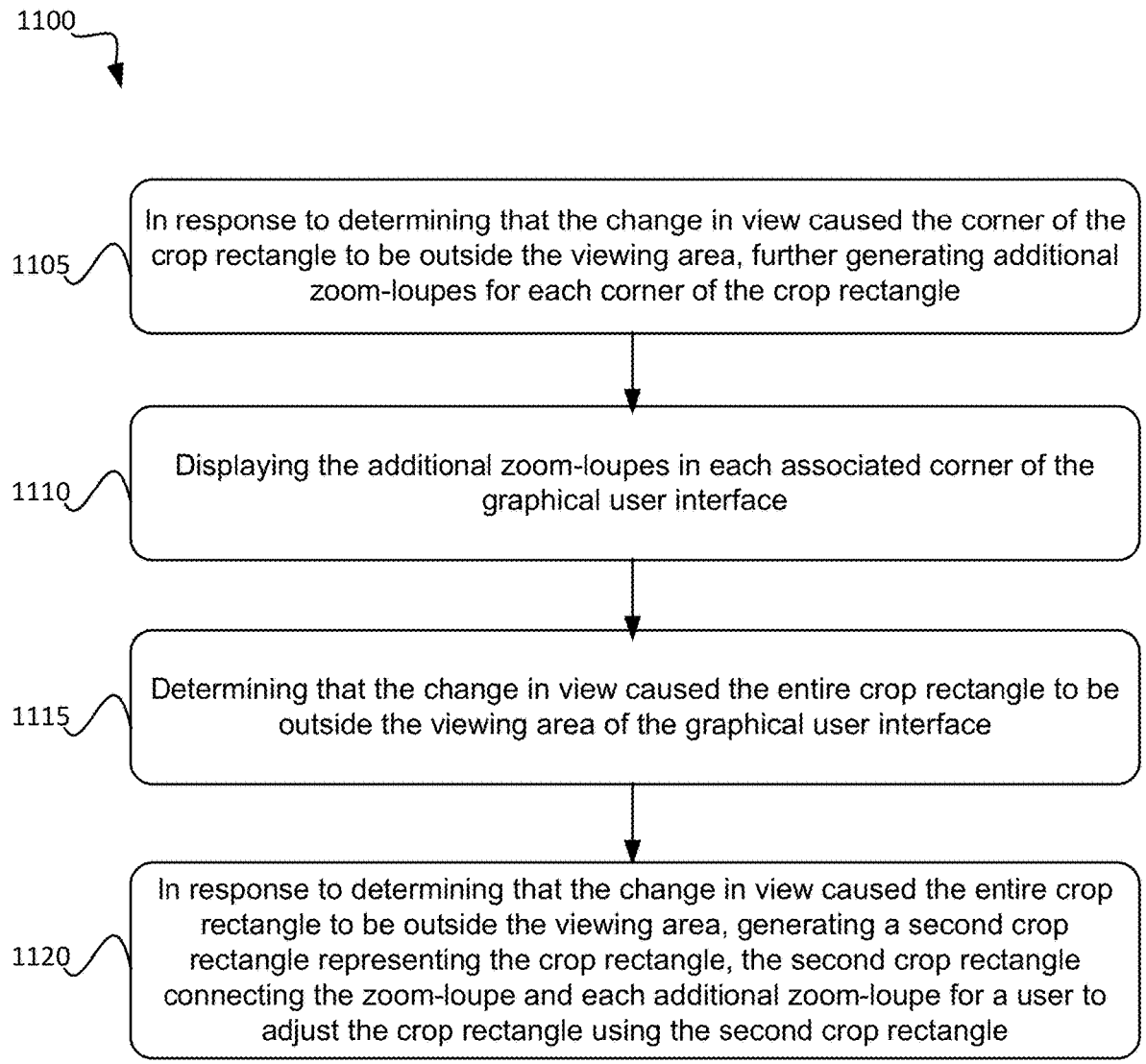
FIG. 11 illustrates an example method for using a second crop rectangle while editing a crop rectangle, according to some embodiments.

FIG. 11 illustrates a method 1100 for generating a second crop rectangle. The method 1100 may be performed by image editing system 100 and more specifically by crop rectangle subsystem 115. Method 1100 can be performed after or as part of method 500. The method 1100 begins at step 1105 with generating additional zoom-loupes for each corner of the crop rectangle in response to determining that the change in view caused the corner of the crop rectangle to be outside the viewing area of the graphical user interface. In this way, a zoom-loupe for each corner of the crop rectangle is created. An example of each corner having a zoom-loupe is shown in FIG. 3. At step 1110, the image editing system displays the additional zoom-loupes in each associated corner of the graphical user interface.

At step 1115, the image editing system determines that the change in view caused the entire crop rectangle to be outside the viewing area of the graphical user interface. In this way, the crop rectangle is not viewable nor can the user manipulate the crop rectangle because the handles are unavailable for selection.

At step 1120, the image editing system, in response to determining the change in view caused the crop rectangle to be outside the viewing area of the graphical user interface, generates a second crop rectangle. The second crop rectangle represents the first crop rectangle and connects each of the corner zoom-loupes. The demarcation line in each zoom-loupe aligns with the second crop rectangle. The user can manipulate the first crop rectangle, despite it being outside the view of the graphical user interface, by moving the second crop rectangle. Movement of the second crop rectangle will adjust the location of the crop rectangle as shown in each of the zoom-loupes. Such adjustment modifies the area of the image that is depicted in each zoom-loupe. As previously noted, the snapshot of the image may be used to generate the zoom-loupes, so the area of the image depicted in each zoom-loupe may be adjusted using the snapshot. Additionally, as the user zooms in to a greater magnification factor of the image, the speed tracker of the second crop rectangle may optionally become slower, allowing for pixel perfect cropping.

Examples of Computing Environments for Implementing Certain Embodiments

Figure 12:
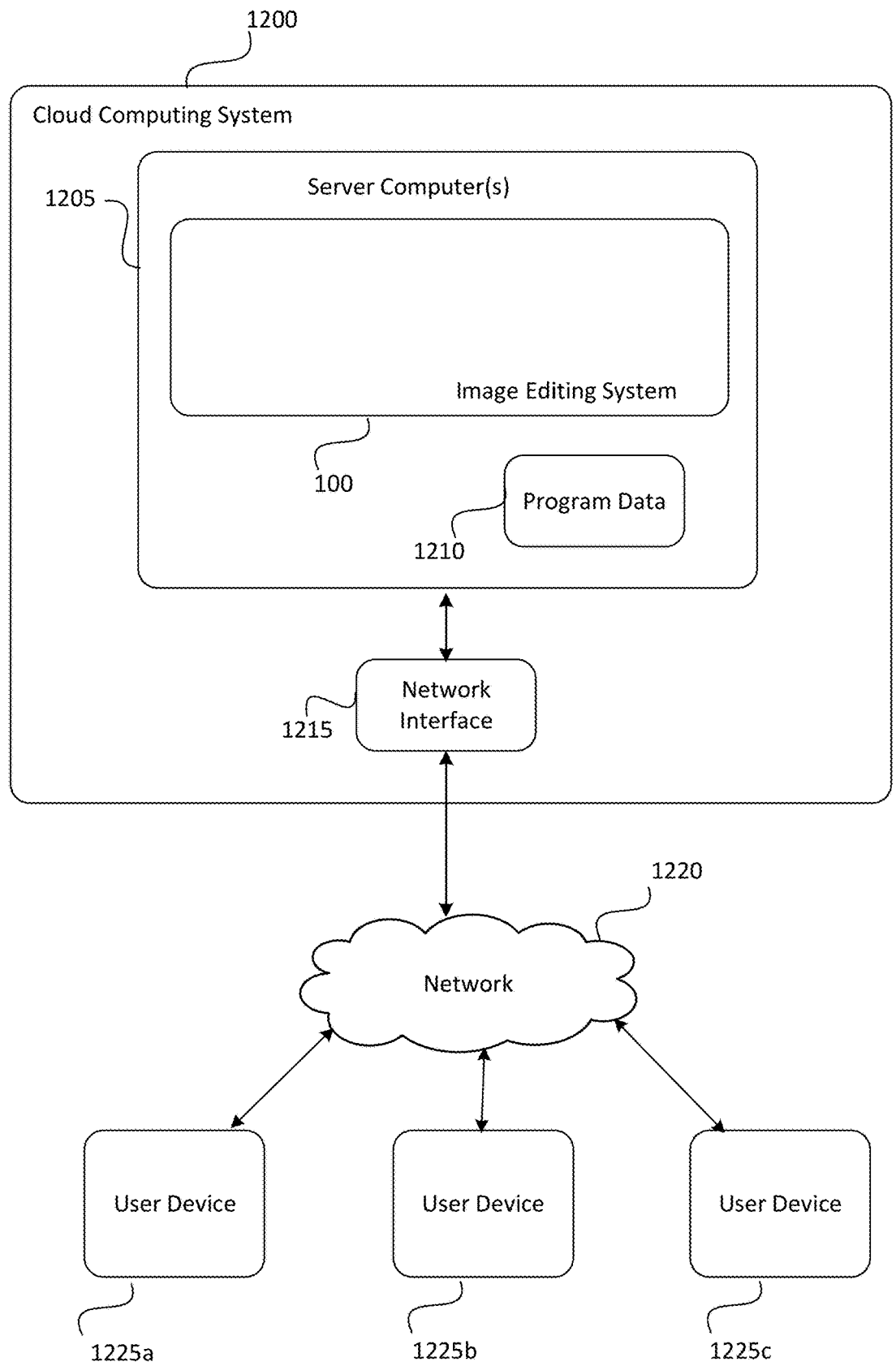
FIG. 12 illustrates an example of a computing system for implementing certain embodiments described herein.
Figure 13:
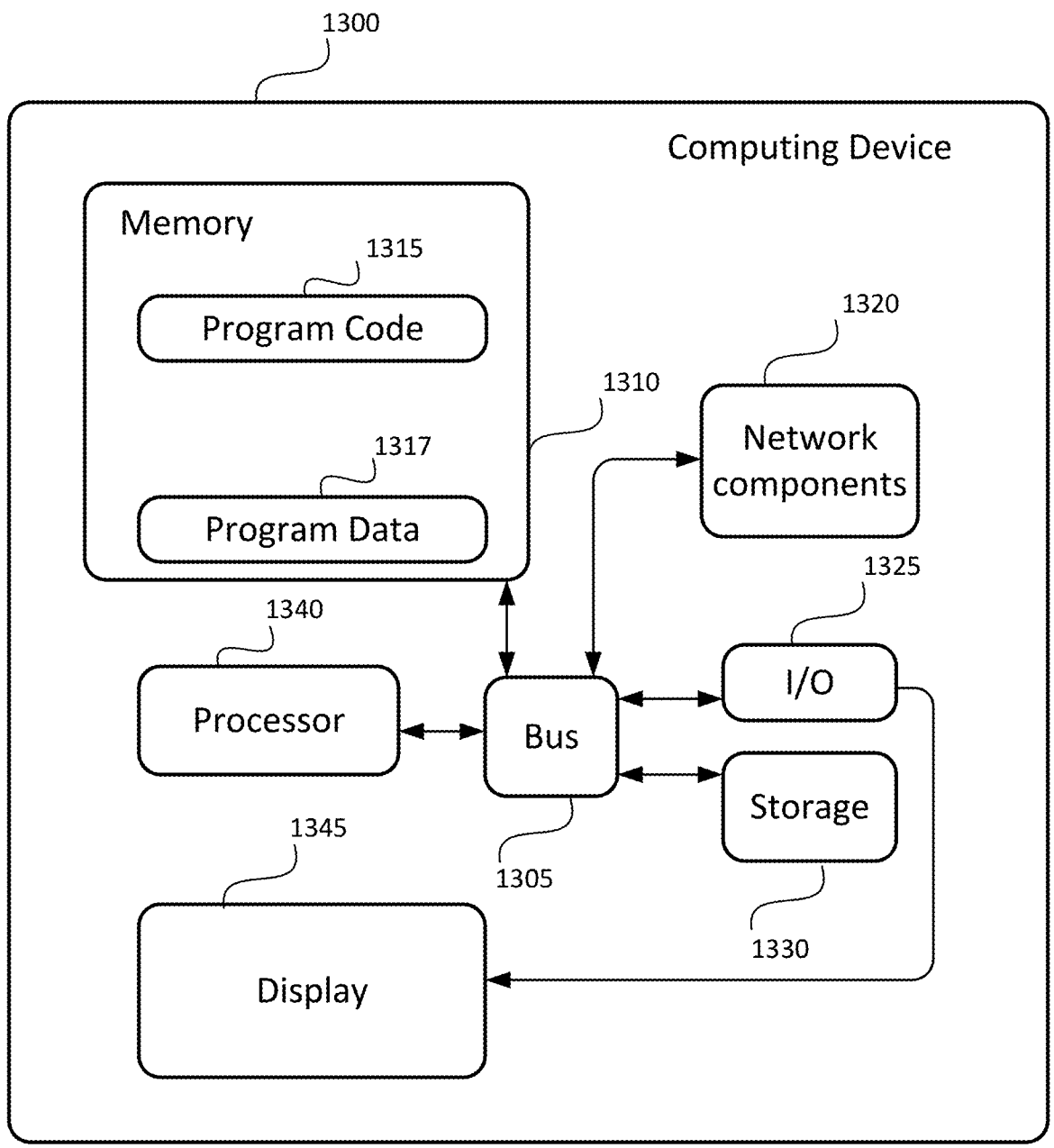
FIG. 13 illustrates an example of a cloud computing system for implementing certain embodiments described herein.

Any suitable computing system or group of computing systems can be used for performing the operations described herein. For example, FIG. 13 depicts an example of computing device 1300 that may be at least a portion of image editing system 100. The implementation of the computing device 1300 could be used for the image editing system 100 or any user device as described herein. In an embodiment, a single image editing system 100 having devices similar to those depicted in FIG. 13 (e.g., a processor, a memory, etc.) combines the one or more operations and data stores depicted as separate subsystems in FIG. 1. Further, FIG. 12 illustrates a cloud computing system 1200 by which at least a portion of the image editing system 100 may be offered.

In some embodiments, the functionality provided by the image editing system 100 may be offered as cloud services by a cloud service provider. For example, FIG. 12 depicts an example of a cloud computing system 1200 offering an image editing service that can be used by a number of user subscribers using user devices 1225*a*, 1225*b*, and 1225*c* across a data network 1220. In the example, the image editing service may be offered under a Software as a Service (SaaS) model. One or more users may subscribe to the image editing service, and the cloud computing system performs the processing to provide the image editing service to subscribers. The cloud computing system may include one or more remote server computers 1205.

The remote server computers 1205 include any suitable non-transitory computer-readable medium for storing program code (e.g., an image editing system 100) and program data 1210, or both, which is used by the cloud computing system 1200 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 1205 can include volatile memory, non-volatile memory, or a combination thereof.

One or more of the servers 1205 execute the program code 1210 that configures one or more processors of the server computers 1205 to perform one or more of the operations that provide image editing services. As depicted in the embodiment in FIG. 12, the one or more servers providing the services to perform image editing may have access to the image editing system 100 and program data 1210. Any other suitable systems or subsystems that perform one or more operations described herein (e.g., one or more development systems for configuring an interactive user interface) can also be implemented by the cloud computing system 1200.

In certain embodiments, the cloud computing system 1200 may implement the services by executing program code and/or using program data 1210, which may be resident in a memory device of the server computers 1205 or any suitable computer-readable medium and may be executed by the processors of the server computers 1205 or any other suitable processor.

In some embodiments, the program data 1210 includes one or more datasets and models described herein. Examples of these datasets include image data, new image content, image energy data, etc. In some embodiments, one or more of data sets, models, and functions are stored in the same memory device. In additional or alternative embodiments, one or more of the programs, data sets, models, and functions described herein are stored in different memory devices accessible via the data network 1215.

The cloud computing system 1200 also includes a network interface device 1215 that enable communications to and from cloud computing system 1200. In certain embodiments, the network interface device 1215 includes any device or group of devices suitable for establishing a wired or wireless data connection to the data networks 1220. Non-limiting examples of the network interface device 1215 include an Ethernet network adapter, a modem, and/or the like. The image editing system 100 is able to communicate with the user devices 1225a, 1225b, and 1225c via the data network 1220 using the network interface device 1215.

FIG. 13 illustrates a block diagram of an example computer system 1300. Computer system 1300 can be any of the described computers herein including, for example, image editing system 100 or server computer 1205. The computing device 1300 can be or include, for example, a laptop computer, desktop computer, tablet, server, or other electronic device.

The computing device 1300 can include a processor 1340 interfaced with other hardware via a bus 1305. A memory 1310, which can include any suitable tangible (and non-transitory) computer readable medium, such as RAM, ROM, EEPROM, or the like, can embody program components (e.g., program code 1315) that configure operation of the computing device 1300. Memory 1310 can store the program code 1315, program data 1317, or both. In some examples, the computing device 1300 can include input/output ("I/O") interface components 1325 (e.g., for interfacing with a display 1345, keyboard, mouse, stylus, user's finger on a touchscreen and the like) and additional storage 1330.

The computing device 1300 executes program code 1315 that configures the processor 1340 to perform one or more of the operations described herein. Examples of the program code 1315 include, in various embodiments, the input/output subsystem 105, zoom-loupe creation subsystem 110, crop rectangle subsystem 115, zoom-loupe location subsystem 120, or any other suitable systems or subsystems that perform one or more operations described herein (e.g., one or more development systems for configuring an interactive user interface). The program code 1315 may be resident in the memory 1310 or any suitable computer-readable medium and may be executed by the processor 1340 or any other suitable processor.

The computing device 1300 may generate or receive program data 1317 by virtue of executing the program code 1315. For example, image 210 and image 710 are examples of program data 1317 that may be used by the computing device 1300 during execution of the program code 1315.

The computing device 1300 can include network components 1320. Network components 1320 can represent one or more of any components that facilitate a network connection. In some examples, the network components 1320 can facilitate a wireless connection and include wireless interfaces such as IEEE 802.11, Bluetooth, or radio interfaces for accessing cellular telephone networks (e.g., a transceiver/antenna for accessing CDMA, GSM, UMTS, or other mobile communications network). In other examples, the network components 1320 can be wired and can include interfaces such as Ethernet, USB, or IEEE 1394.

Although FIG. 13 depicts a single computing device 1300 with a single processor 1340, the system can include any number of computing devices 1300 and any number of processors 1340. For example, multiple computing devices 1300 or multiple processors 1340 can be distributed over a wired or wireless network (e.g., a Wide Area Network, Local Area Network, or the Internet). The multiple computing devices 1300 or multiple processors 1340 can perform any of the steps of the present disclosure individually or in coordination with one another.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

What is claimed is:

1. A method, comprising:
receiving, by an image editing program executed by a user device, an indication of entering a cropping function mode for an image being edited in a graphical user interface, wherein the cropping function mode comprises displaying a crop rectangle for selection of a crop area;
receiving, by the image editing program, an indication of a change in view of the image within the graphical user interface;
determining, by the image editing program, that the change in view caused a corner of the crop rectangle to be outside a viewing area of the graphical user interface;
in response to determining that the corner of the crop rectangle is outside the viewing area, generating, by the image editing program, a zoom-loupe for the corner, wherein the zoom-loupe displays a portion of the image corresponding to the corner of the crop rectangle at a magnification factor, and wherein the portion of the image comprises a crop area of the image separated by a demarcation line from a non-crop area of the image; and
displaying, by the image editing program, the zoom-loupe in an associated corner of the graphical user interface.

2. The method of claim 1, wherein generating the zoom-loupe comprises:
identifying a shape of the zoom-loupe corresponding to the corner of the crop rectangle;
determining input dimensions of the image for the zoom-loupe based on the shape of the zoom-loupe and the magnification factor; and
determining a location on the graphical user interface relative to the corner for display of the zoom-loupe.

3. The method of claim 1, further comprising:
determining that the change in view caused more than one corner of the crop rectangle to be outside the viewing area of the graphical user interface; and
in response to determining that the change in view caused more than one corner of the crop rectangle to be outside the viewing area, generating an additional zoom-loupe for each corner outside the viewing area.

4. The method of claim 1, further comprising:
receiving an indication of a selection of a touchpoint on an edge of the crop rectangle indicating a zoom point;
determining that the change in view caused the zoom point to be outside the viewing area of the graphical user interface;
in response to determining that the zoom point is outside the viewing area of the graphical user interface, generating a second zoom-loupe for the zoom point, wherein the second zoom-loupe displays a second portion of the image corresponding to the zoom point on the crop rectangle at the magnification factor, and wherein the second portion of the image comprises a second crop area of the image separated by a second demarcation line from a second non-crop area of the image; and
displaying, by the image editing program, in the graphical user interface, the second zoom-loupe.

5. The method of claim 1, further comprising:
in response to determining that the change in view caused the corner of the crop rectangle to be outside the viewing area, generating an additional zoom-loupe for each corner of the crop rectangle; and
displaying the additional zoom-loupes in each associated corner of the graphical user interface.

6. The method of claim 5, further comprising:
receiving an indication of a selection of a touchpoint on an edge of the crop rectangle indicating a zoom point;
in response to determining that the change in view caused the corner of the crop rectangle to be outside the viewing area, generating a zoom-point zoom-loupe for the zoom point, wherein the zoom-point zoom-loupe displays a second portion of the image corresponding to the zoom point on the crop rectangle at the magnification factor, and wherein the second portion of the image comprises a second crop area of the image separated by a second demarcation line from a second non-crop area of the image; and
displaying, by the image editing program, in the graphical user interface, the zoom-point zoom-loupe.

7. The method of claim 1, further comprising:
in response to determining that the change in view caused the corner of the crop rectangle to be outside the viewing area, further generating an additional zoom-loupe for each corner of the crop rectangle;
displaying the additional zoom-loupes in each associated corner of the graphical user interface;
determining that the change in view caused the entire crop rectangle to be outside the viewing area of the graphical user interface; and
in response to determining that the change in view caused the entire crop rectangle to be outside the viewing area, generating a second crop rectangle representing the crop rectangle, the second crop rectangle connecting the zoom-loupe and each additional zoom-loupe, wherein adjusting the second crop rectangle adjusts the crop rectangle.

8. The method of claim 7, further comprising:
receiving an indication of a selection of a touchpoint on an edge of the crop rectangle indicating a zoom point;
in response to determining that the zoom point is outside the viewing area of the graphical user interface, generating a zoom-point zoom-loupe for the zoom point, wherein the zoom-point zoom-loupe displays a second portion of the image corresponding to the zoom point on the crop rectangle at the magnification factor, and wherein the second portion of the image comprises a second crop area of the image separated by a second demarcation line from a second non-crop area of the image; and
displaying, by the image editing program, in the graphical user interface, the zoom-point zoom-loupe, wherein the second crop rectangle corresponds to the second demarcation line.

9. The method of claim 7, wherein the crop rectangle has a first tracker speed that determines a speed of movement of the crop rectangle based on a speed of movement of a selection tool for resizing the crop rectangle, and the second crop rectangle has a second tracker speed.

10. The method of claim 9, wherein the second tracker speed is based on a magnification factor of the image in the graphical user interface.

11. The method of claim 9, wherein the second tracker speed is inversely proportional to a magnification factor of the image in the graphical user interface.

12. A non-transitory computer-readable memory device having stored thereon instructions that, when executed by one or more processors, cause the one or more processors to:
receive an indication of entering a cropping function mode of an image being edited in a graphical user interface, wherein the cropping function mode comprises displaying a crop rectangle for selection of a crop area;

receive an indication of a change in view of the image within the graphical user interface;

determine that the change in view caused a corner of the crop rectangle to be outside a viewing area of the graphical user interface;

in response to determining that the corner of the crop rectangle is outside the viewing area, generate a zoom-loupe for the corner, wherein the zoom-loupe displays a portion of the image corresponding to the corner of the crop rectangle at a magnification factor, and wherein the portion of the image comprises a crop area of the image separated by a demarcation line from a non-crop area of the image; and display the zoom-loupe in an associated corner of the graphical user interface.

13. The non-transitory computer-readable memory device of claim 12, wherein the instructions to generate the zoom-loupe further comprises instructions that, when executed by the one or more processors, cause the one or more processors to:

identify a shape of the zoom-loupe corresponding to the corner of the crop rectangle;

determine input dimensions of the image for the zoom-loupe based on a the shape of the zoom-loupe and the magnification factor; and determine a location on the graphical user interface relative to the corner for display of the zoom-loupe.

14. The non-transitory computer-readable memory device of claim 12, further comprising instructions that, when executed by the one or more processors, cause the one or more processors to:

receive an indication of a selection of a touchpoint on an edge of the crop rectangle indicating a zoom point;

in response to determining that the corner is outside the viewing area of the graphical user interface, generate a second zoom-loupe for the zoom point, wherein the second zoom-loupe displays a second portion of the image corresponding to the zoom point on the crop rectangle at the magnification factor, and wherein the second portion of the image comprises a second crop area of the image separated by a second demarcation line from a second non-crop area of the image; and display the second zoom-loupe in the graphical user interface.

15. The non-transitory computer-readable memory device of claim 12, further comprising instructions that, when executed by the one or more processors, cause the one or more processors to:

in response to determining that the change in view caused the corner of the crop rectangle to be outside the viewing area, generate an additional zoom-loupe for each corner of the crop rectangle; and display the additional zoom-loupes in each associated corner of the graphical user interface.

16. The non-transitory computer-readable memory device of claim 12, further comprising instructions that, when executed by the one or more processors, cause the one or more processors to:

in response to determining that the change in view caused the corner of the crop rectangle to be outside the viewing area, generate an additional zoom-loupe for each corner of the crop rectangle;

display the additional zoom-loupes in each associated corner of the graphical user interface;

determine that the change in view caused the entire crop rectangle to be outside the viewing area of the graphical user interface; and in response to determining that the change in view caused the entire crop rectangle to be outside the viewing area, generate a second crop rectangle representing the crop rectangle, the second crop rectangle connecting the zoom-loupe and each additional zoom-loupe.

17. The non-transitory computer-readable memory device of claim 16, further comprising instructions that, when executed by the one or more processors, cause the one or more processors to:

receive an indication of a selection of a touchpoint on an edge of the crop rectangle indicating a zoom point;

in response to determining that the corner of the crop rectangle is outside the viewing area of the graphical user interface, generate a zoom-point zoom-loupe for the zoom point, wherein the zoom-point zoom-loupe displays a second portion of the image corresponding to the zoom point on the crop rectangle at the magnification factor, and wherein the second portion of the image comprises a second crop area of the image separated by a second demarcation line from a second non-crop area of the image; and display, in the graphical user interface, the zoom-point zoom-loupe wherein the second crop rectangle corresponds to the second demarcation line.

18. A system, comprising:

one or more processors; and a memory having stored thereon instructions that, when executed by the one or more processors, cause the one or more processors to:

receive an indication of entering a cropping function mode of an image being edited in a graphical user interface, wherein the cropping function mode comprises displaying a crop rectangle for selection of a crop area;

receive an indication of a change in view of the image within the graphical user interface;

determine that the change in view caused the entire crop rectangle to be outside a viewing area of the graphical user interface; and in response to determining that the entire crop rectangle is outside the viewing area:

generate a zoom-loupe for each corner of the crop rectangle, wherein each zoom-loupe displays a portion of the image corresponding to an associated corner of the crop rectangle at a magnification factor, and wherein the portion of the image in each zoom-loupe comprises a crop area of the image that separated by a demarcation line from a non-crop area of the image;

generate a second crop rectangle representing the crop rectangle, the second crop rectangle connecting the demarcation line of each zoom-loupe; and display each zoom-loupe and the second crop rectangle in the graphical user interface.

19. The system of claim 18, wherein the crop rectangle has a first tracker speed that determines a speed of movement of the crop rectangle based on a speed of movement of a selection tool for resizing the crop rectangle, and the second crop rectangle has a second tracker speed.

20. The system of claim 19, wherein the second tracker speed is inversely proportional to a magnification factor of the image in the graphical user interface.

* * * * *